US008095475B2

(12) United States Patent
Hutson et al.

(10) Patent No.: US 8,095,475 B2
(45) Date of Patent: Jan. 10, 2012

(54) SYSTEM AND METHOD FOR PREPAY ACCOUNT MANAGEMENT SYSTEM

(75) Inventors: Craig D. Hutson, Decatur, TX (US); Chris Gaines, Dallas, TX (US); Daniel A. Hanson, Dallas, TX (US)

(73) Assignee: Exceleron Software, Inc., Dallas, TX (US)

( * ) Notice: Subject to any disclaimer, the term of this patent is extended or adjusted under 35 U.S.C. 154(b) by 812 days.

(21) Appl. No.: 11/387,611

(22) Filed: Mar. 23, 2006

(65) Prior Publication Data

US 2007/0260562 A1 Nov. 8, 2007

(51) Int. Cl.
*G06Q 10/00* (2006.01)
*G01R 11/56* (2006.01)
*G08B 23/00* (2006.01)

(52) U.S. Cl. ............ 705/412; 705/1.1; 340/870.02

(58) Field of Classification Search .......... 705/1, 412, 705/1.1; 340/870.02
See application file for complete search history.

(56) References Cited

U.S. PATENT DOCUMENTS

| 4,795,892 A * | 1/1989 | Gilmore et al. ............... 235/381 |
|---|---|---|
| 5,677,945 A | 10/1997 | Mullins et al. |
| 6,188,689 B1 | 2/2001 | Katsube et al. |
| 6,452,505 B1 | 9/2002 | Taglioni |
| 6,452,915 B1 | 9/2002 | Jorgensen |
| 6,667,967 B1 | 12/2003 | Anderson et al. |
| 6,900,738 B2 | 5/2005 | Crichlow |
| 7,126,918 B2 | 10/2006 | Roberts |
| 7,161,942 B2 | 1/2007 | Chen et al. |
| 7,274,305 B1 * | 9/2007 | Luttrell ................... 340/870.02 |
| 7,400,264 B2 * | 7/2008 | Boaz ....................... 340/870.02 |
| 2001/0027490 A1 | 10/2001 | Fodor et al. |
| 2001/0051933 A1 * | 12/2001 | Rowley et al. ............... 705/412 |
| 2002/0040355 A1 * | 4/2002 | Weiner ........................ 705/412 |
| 2002/0065761 A1 * | 5/2002 | Fischer et al. ................. 705/37 |
| 2002/0120569 A1 | 8/2002 | Day |
| 2002/0178063 A1 * | 11/2002 | Gravelle et al. ............... 705/17 |
| 2003/0055677 A1 * | 3/2003 | Brown et al. .................... 705/1 |
| 2003/0167178 A1 | 9/2003 | Jarman et al. |
| 2003/0225713 A1 * | 12/2003 | Atkinson et al. ............. 705/412 |
| 2004/0024483 A1 * | 2/2004 | Holcombe .................... 700/122 |
| 2004/0093298 A1 * | 5/2004 | McClure et al. ............... 705/37 |
| 2004/0098293 A1 * | 5/2004 | Hanson ........................... 705/8 |
| 2004/0181463 A1 * | 9/2004 | Goldthwaite et al. ......... 705/26 |

(Continued)

FOREIGN PATENT DOCUMENTS

CN 1322326 A 11/2001
(Continued)

OTHER PUBLICATIONS

LogicaCMG Systems Now Operate 75% of the Contestable Gas Region in Australia, Aug. 4, 2004, PR Newswire, pp. 1-3.*

(Continued)

*Primary Examiner* — Fadey Jabr
(74) *Attorney, Agent, or Firm* — Haynes and Boone, LLP (57) ABSTRACT

A prepay account management system comprises a secure data link operable to transmit a prepay customer account and meter data, a prepay server operable to receive the transmitted customer account data, the prepay server operable to update a balance of a prepay customer account in response to usage charges and replenishing payment amounts, and a notification server operable to deliver a notification to the prepay customer in response to specific triggers associated with the prepay customer account according to the prepay customer preferences.

34 Claims, 11 Drawing Sheets

U.S. PATENT DOCUMENTS

| | | | |
|---|---|---|---|
| 2004/0198316 A1* | 10/2004 | Johnson | 455/406 |
| 2004/0205022 A1* | 10/2004 | Halford | 705/40 |
| 2004/0243525 A1 | 12/2004 | Forrester | |
| 2005/0033707 A1 | 2/2005 | Ehlers et al. | |
| 2005/0187888 A1 | 8/2005 | Sherman et al. | |
| 2006/0031180 A1* | 2/2006 | Tamarkin et al. | 705/412 |
| 2007/0083479 A1* | 4/2007 | Swartz et al. | 705/412 |
| 2009/0132096 A1* | 5/2009 | Swarztrauber et al. | 700/295 |

FOREIGN PATENT DOCUMENTS

| | | |
|---|---|---|
| DE | 199 27 296 A1 | 12/2000 |
| DE | 19927296 A1 | 12/2000 |
| EP | 0 015 120 A1 | 2/1980 |
| EP | 0015120 A1 | 9/1980 |
| EP | 1 249 995 A2 | 10/2002 |
| EP | 1249995 A2 | 10/2002 |
| EP | 1249995 A2 | 10/2002 |
| WO | WO 94/19899 A1 | 9/1994 |

OTHER PUBLICATIONS

Tamarkin, Tom D., "Automatic Meter Reading", Public Power, vol. 50, No. 5, Sep.-Oct. 1992, 6 pages.

Flowmeter Directory, "Automatic Meter Reading", www.flowmeterdirectory.com/flowmeter_automatic_meter_reading.html, 2 pages.

Archnet, Automatic Meter Reading (AMR) System, www.archnetco.com/english/product/product_s1.htm, 5 pages.

Patent Cooperation Treaty International Searching Authority—European Patent Office, Notification of Transmittal of the International Search Report and The Written Opinion of the International Searching Authority, or the Declaration, International Application No. PCT/US2007/063827, Nov. 14, 2007, 14 pages.

Chinese Office Action dated Sep. 30, 2010, Application No. 200780016091.6, 18 pages.

\* cited by examiner

SYSTEM AND METHOD FOR PREPAY ACCOUNT MANAGEMENT SYSTEM

BACKGROUND

Utility companies today face the challenges of providing services to low income customers or customers who may have questionable or no credit history. These companies often have to manage customer accounts that are behind on payments for electricity, gas, water and other utilities. The utility companies have the option of discontinuing future delivery of utilities to those customers but are often left with the difficult task of collecting payment for utilities that have already been consumed. In most instances, these debts are not collectible.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
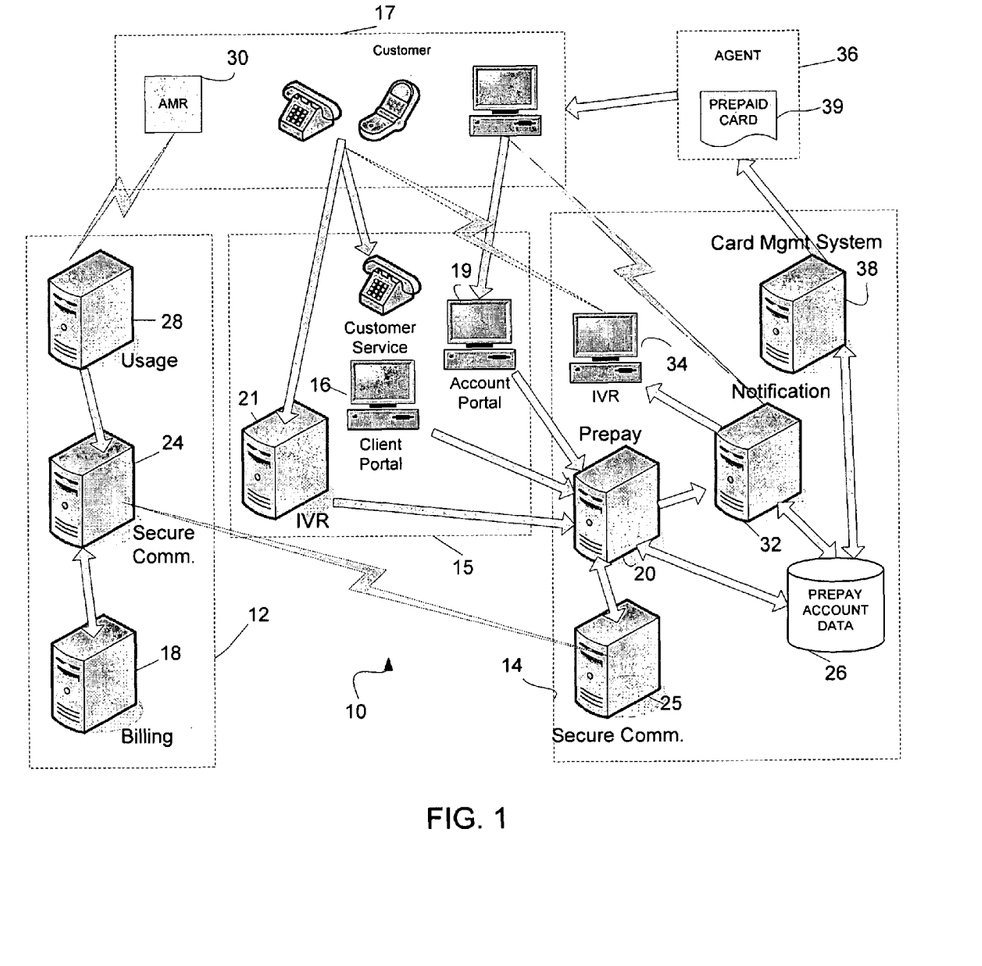
FIG. 1 is a simplified block diagram of an embodiment of a system and method of prepay account management system.

FIG. 1 is a simplified block diagram of an embodiment of a prepay account management system 10. System 10 may be integrated and operate in cooperation with a legacy hardware and/or software utility subsystem 12 that manages existing utility customer accounts. System 10 comprises a hardware and/or software subsystem 14 that is operable to manage prepay utility customer accounts and a customer interface subsystem 15 that is operable to provide a multi-media interface with prepay account customers. Subsystems 12, 14 and 15 may be co-located or located remotely from one another. Subsystem 12 includes a legacy billing system 18 that includes or has access to customer billing data and a usage database 28 that is operable to store customers' utility usage data.

Typically, a customer or potential customer 17 may call a designated telephone number to speak to a customer service representative, who may use a client portal 16 to access and enter information about the customers. The customer service representative can provide information about the prepay service and sign-up the caller as a new prepay account customer. The customer service representative can set-up a new prepay account for the new customer and enter all relevant customer data. A new prepay account is thus created in legacy billing system 18.

As an alternative to using a customer service representative, a web-based customer service system 19 may be used. A prospective customer that has already established an account in the legacy billing system may obtain information about the prepay utility service and sign-up online. The customer service system then passes the new customer account information to prepay server 20, in which a new prepay account is created.

Customer interface subsystem 15 may also include an interactive voice response (IVR) system 21 that is operable to provide general information and basic account information to prepay utility customers. When necessary, a customer may ask to be routed to a customer service representative via IVR system 21.

In one scenario, the utility company using system 10 is a utility cooperative having a plurality of existing members. The prepay service may be an additional program offered to the cooperative members. By taking advantage of the prepay utility service, the members do not have to provide a deposit for the utility service. The prepay service may be advantageously used by the members as a budgeting device that enables a higher priority be placed on uninterrupted utility service. The pay-as-you-go model of the prepay service is easy to comprehend and follow for members living a certain lifestyle. The members are also able to monitor their daily utility usage at any time.

Legacy billing system 18 is operable to relay the new customer account and associated data to a prepay server 20 via a secure communication link 22. Secure communication link 22 provides secure data transfer between two secure communication servers 24 and 25. Secure communication link 22 may span a variety of computer networks such as local area network (LAN), wide area network (WAN), virtual private network (VPN), the Internet, etc. and employ security features now known, such as encryption, or later developed to safeguard the content of the data transmissions. The customer account data may be stored in a database 26.

Usage system 28 is operable to receive daily utility usage data from an automatic meter reading (AMR) database 30. An automatic meter reading device typically includes a meter that determines the amount of usage, and a meter interface unit (MIU) that is operable to relay the usage data to a remote database via a communications network. The utility usage data are collected by the meter and sent to the meter interface unit (not shown), which delivers the data to a database accessed by usage system 28. The daily usage data that are associated with a prepay customer are then transmitted, via secure communication servers 24 and 25, to prepay server 20. Prepay server 20 is then operable to process the daily usage data and update the prepay customer account balance.

Alternatively, the prepay customers' utility usage may be monitored in real-time, and usage system 28 is operable to receive the customers' real-time utility usage data from real-time AMR devices. Operating in this manner, system 10 may process the real-time usage data and provide more current prepay customer account balance and even more timely notification than the daily usage processing as described above.

As an alternative, usage system 28 may accumulate daily usage data and transmit the data to prepay server 20 at an interval other than daily. For example, prepay server 20 may receive and process weekly usage data. In order to compensate for more infrequent account balance updates, system 10 may require a higher low balance threshold in each prepay account. Some automatic meter reading devices are operable to collect and accumulate usage data for transmission on an interval other than daily.

Subsystem 14 further includes a notification system 32. Notification system 32 is operable to notify prepay customers about certain pre-designated events related to the prepay accounts. For example, a prepay customer may be notified when his/her account balance drops below a certain level. Another prepay customer may desire a daily notification of the account balance. Notification system 32 may use a number of notification methods pre-selected by the customer. Notification system 32 is preferably coupled to a number of communication pathways such as an IVR system 34, the public switched telephone network, the Internet, etc. to enable a variety of notification delivery methods. For example, the customer may select email or instant messaging for low account balance notifications, and interactive voice response (IVR) messaging for daily usage notifications. Notification system 32 may further specify or permit the customer to specify the timing for delivering the notification to ensure optimal reception of the messages. Notification system 32 is operable to access database 26 for information associated with a prepay customer or his/her account, such as account balance, daily usage amounts, notification preferences, etc.

A subsystem 38 provides support for prepaid card management. Prepaid cards 39 are provided to agents and/or retail locations 36 for sale to prepay account customers. Recorded on each prepaid card 39 is a unique serial number, personal identification number (PIN), and a predetermined denomination. Prepay account customers may activate the cards via telephone or the Internet. Upon activation, a credit is posted to the customer's account in prepay server 20 and the card management system 38 is updated to reflect that the card has been used. Agents 36 are invoiced by the card management subsystem based on card usage.

It should be noted that each system and server described above may be implemented in hardware, software and/or a combination thereof. Further, each system, server or node in system 10 may be implemented by a plurality of computers (personal computers, workstations, servers, etc.) or by a single computer. The functionalities of subsystems 12 and/or 14 may also be performed by a plurality of computers or a single computer. The entities identified in FIG. 1 may be logical functional blocks in system 10 providing specific functionality therefore such as billing, daily usage monitoring, notification, secure communication, etc.

Figure 2:
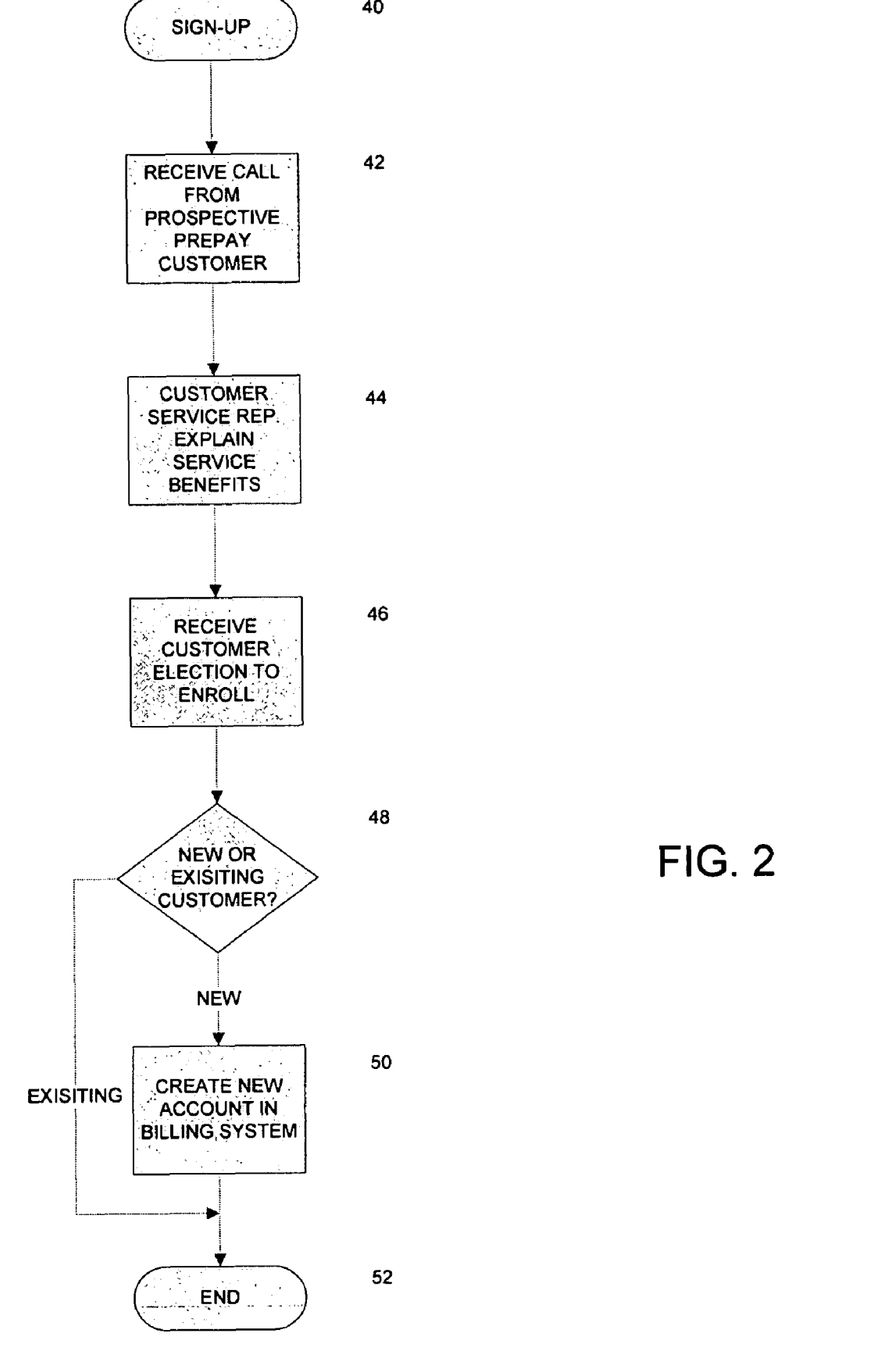
FIG. 2 is a flowchart of an embodiment of a method of new customer sign-up for prepay utility service.

FIG. 2 is a flowchart of an embodiment of a method 40 of new customer sign-up for prepay utility services. A customer service representative receives a telephone call from a prospective customer in step 42. The customer service representative provides information about the prepay utility service and answers any questions the prospective customer may have about the services in step 44. In step 46, the customer service representative receives instructions from the customer to sign-up for the prepay services. The customer service representative determines if the customer is a new or existing customer in step 48. If the customer is a new account, the customer service representative establishes a new account by entering information related to the new customer in legacy billing system 18 and create a new customer account therein in step 50. The customer information may include the customer name, customer address, telephone number, and email address. Alternatively, if the customer has an existing account in the legacy billing system, no other action is required. The process ends in step 52.

Figure 3:
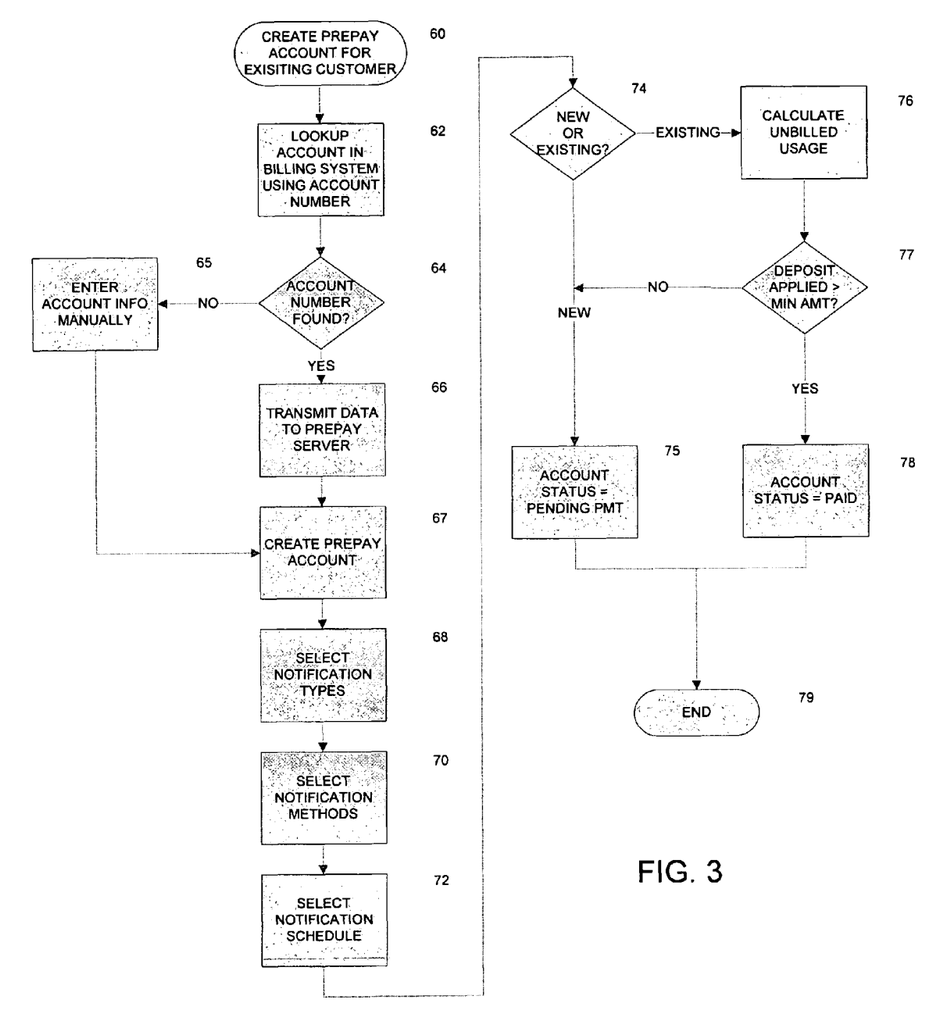
FIG. 3 is a flowchart of an embodiment of a method of creating a new prepay customer account.

FIG. 3 is a flowchart of an embodiment of a method 60 of creating a new prepay customer account. In step 62, the utility account number is entered by the customer service representative and is used to retrieve account information from the billing server 18. This information may include customer name, customer address, customer telephone number(s), email addresses, meter and billing information, and other data. If the lookup is successful, secure communication server 24 transmits or otherwise provides the new account information to prepay server 20 in step 66. If the account number lookup fails to return the requested data, the customer service representative then manually enters the required information in step 65. A new prepay account is then created in prepay server 20 in step 67. Notification preferences are set up in steps 68 through 72.

In steps 68 and 70, one or more types and methods of notification is selected. For example, the customer may indicate that email is preferred for notifying him/her that the account requires a recharge payment to avoid disconnection, and a usage message delivered to his/her mobile telephone number is the preferred method. In step 72, the account setup may also include a customer-selected frequency of notification. For example, the customer may indicate that he/she prefers a daily usage notification. Another customer may prefer a bi-monthly usage notification. In step 72, the new prepay account setup may also enable the customer to indicate the preferred time of notification. The customer may also indicate at which account balance amount he/she is to be notified. For example, the customer may want to be notified when his account balance drops below $10. Prepay server 20 may maintain certain minimum thresholds for low balance notifications to ensure that the customer will always receive timely notification. If the customer has an existing account as determined in step 74, unbilled usage is calculated in step 76. In step 77, it is determined whether the customer's previously paid deposit should be applied to the minimum account balance. If the deposit is not to be applied, then the account status is set to "pending payment" in step 75. If the deposit is to be applied to the minimum account balance, then the account status is set to "paid" in step 78. The process ends in step 79. As a result, a customer's account notification preferences may be summarized as in Table A:

TABLE A

| Recharge | Low Balance | Daily | Notification Preferences | | |
|---|---|---|---|---|---|
| ☑ | ☑ | | Primary Contact: | 972-555-1234 | 6:00 pm-8:00 pm |
| | ☑ | | Secondary Contact: | 214-555-1234 | 2:00 pm-5:00 pm |
| ☑ | ☑ | ☑ | Email: | Joe@coop.org | any time |

Figure 4:
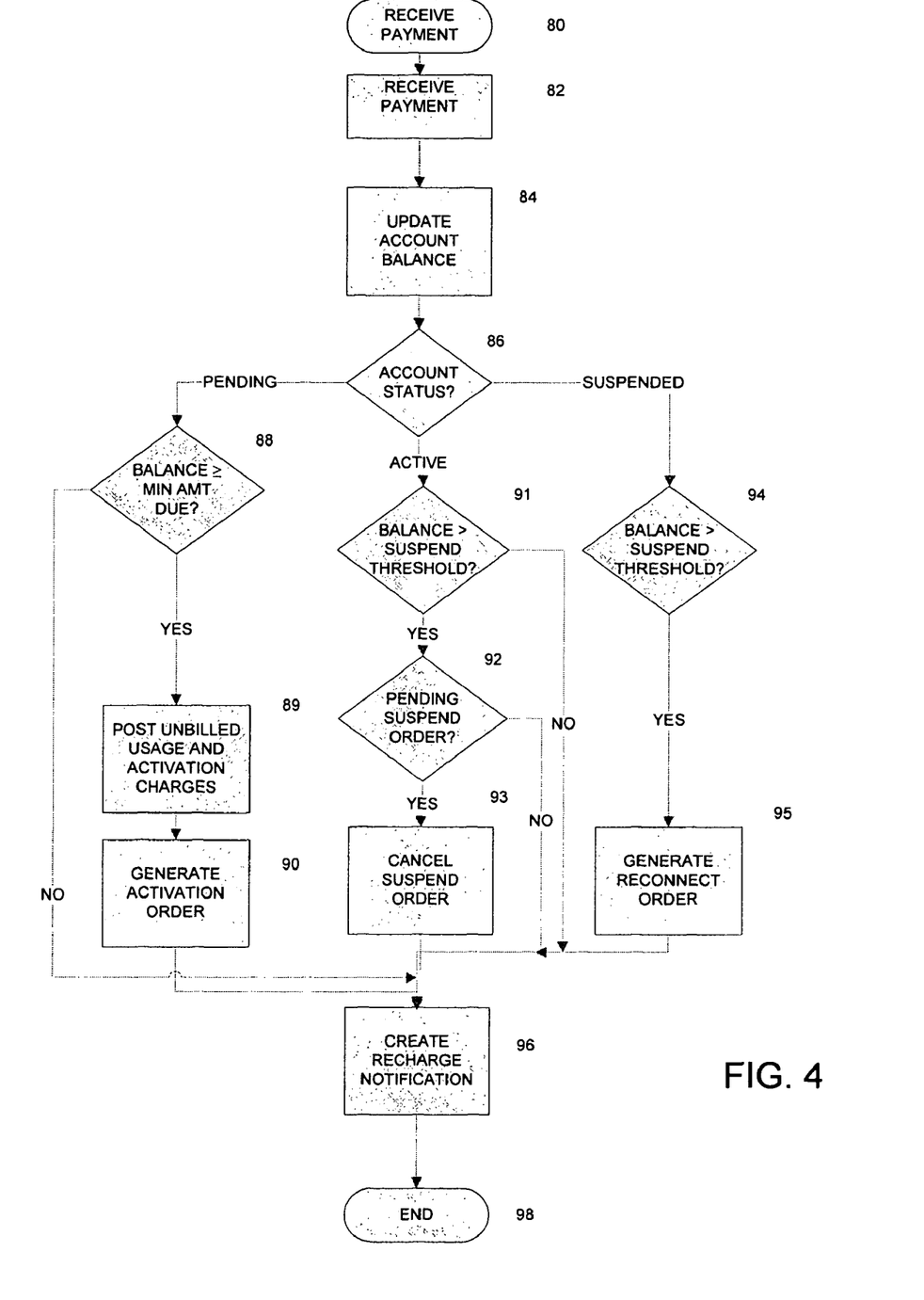
FIG. 4 is a flowchart of an embodiment of a method of receiving a payment.

FIG. 4 is a flowchart of an embodiment of a method 80 of receiving payment. Payments may be received at the time of account set-up as well as at any time the customer desires to replenish his/her prepay account balance. The customer may make payments in a variety of ways. For example, the customer may use established money transfer or bill payment services (such as WESTERN UNION, MONEYGRAM, and ACE CASH EXPRESS), use a credit card or debit card online or over the telephone with the customer service representative, use automated clearing house (ACH) fund transfer networks, or use authorized agents. In step 82, an electronic notification that a payment has been made on a prepay account is received. The notification may include the customer prepay account number, customer name, and the payment amount. The prepay account balance is then updated to reflect the addition of the payment amount in step 84. A check is then made in step 86 to determine if the current account status is Pending, Active, or Suspended. If the account status is Pending, the current balance is compared to the minimum amount due in step 88. The Minimum amount due may include installation/setup charges, unbilled usage that has accumulated since the last billing cycle, and any past due balance. If the balance is greater than or equal to the minimum amount due, the charges are applied to the account in step 89 and an activation order is generated in step 90. If the account status is Active in step 86, then a check is made to determine whether there is a pending service suspend order in step 92. If there is a pending suspend service order, and if the current balance is also greater than the suspend threshold as determined in step 91, then the suspend service order is cancelled in step 93. If the current account status is determined to be Suspended in step 86, then a check is made to determine if the current balance is greater than the suspend threshold as determined in step 94. If so, a reconnect order is generated in step 95. A recharge notification is then created in step 96 so that the customer receives confirmation of his/her payment. The process ends in step 98.

Figure 5:
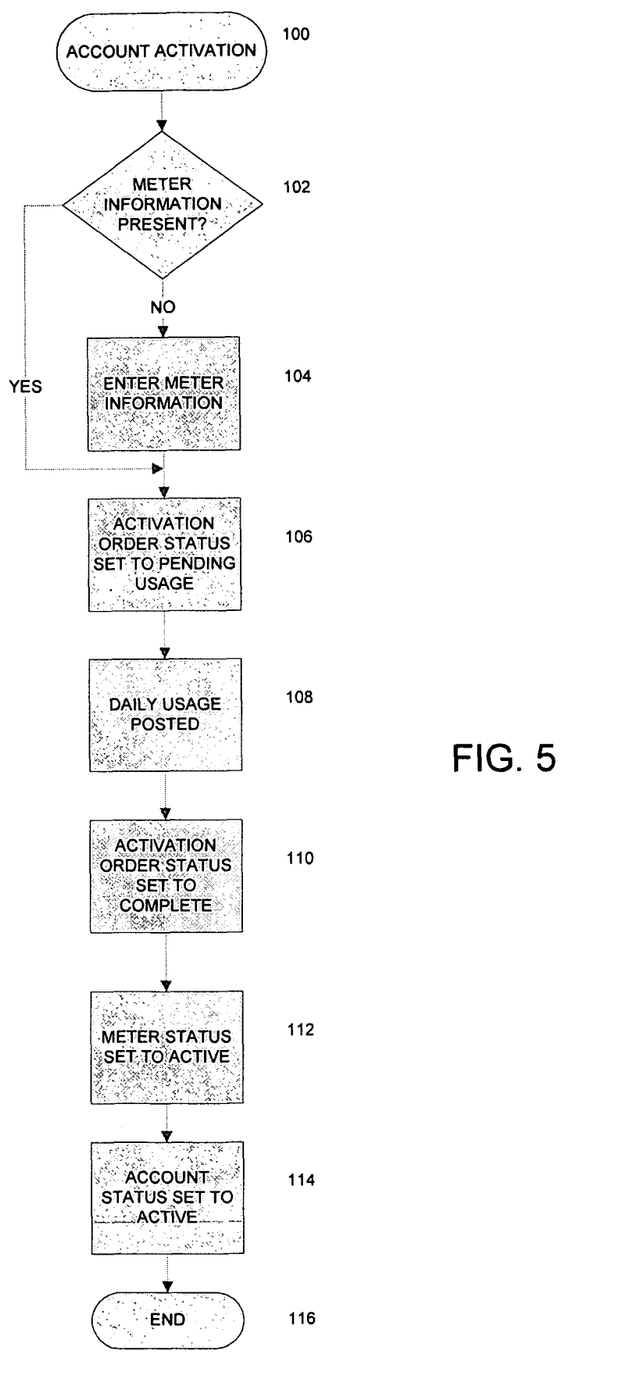
FIG. 5 is a flowchart of an embodiment of a method account activation.

FIG. 5 is a flowchart of an embodiment of a method 100 of an account activation process. Prior to activating a prepay account, specific meter information such as the meter number, beginning meter reading, meter install date and last meter read date are stored in the system. This meter information is checked and verified in step 102. If the meter information is not available at the time the account is created, it is entered in step 104. Once the required information is entered, the activation order status is set to "pending usage" in step 106 upon installation confirmation. An account cannot be activated until the first daily usage data is posted in step 108. The activation order status is set to "completed" and the order is logged in step 110. This causes the meter status to be set to "active" in step 112 and the account status is also set to "active" in step 114. The process ends in step 116.

Figure 6:
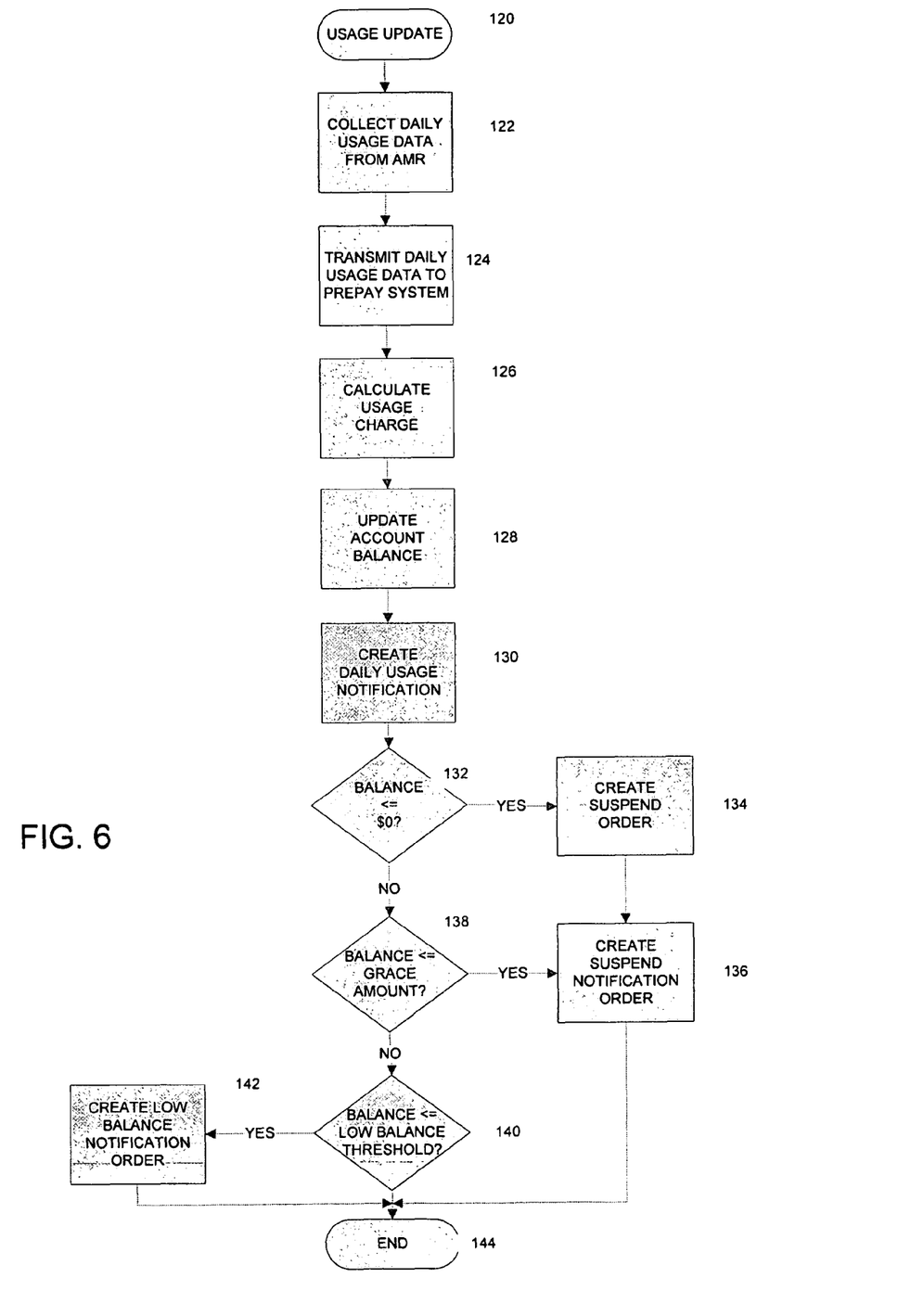
FIG. 6 is a flowchart of an embodiment of a method of updating customer usage.

FIG. 6 is a flowchart of an embodiment of a method 120 of updating customer usage. In step 122, the daily usage data is collected from the remote automated meter reading devices. This collected data is then transmitted to prepay server 20 in subsystem 14 in step 124. The usage cost for that day is then calculated in step 126. The daily usage charge is computed based on the number of kilowatts used, a base rate, estimated or actual Power Charge Adjustment (PCA) (also called Power Cost Recovery Factor or PCRF), local sales taxes, option usage, etc. The customer's account balance is then updated by subtracting the daily usage charge from the current account balance in step 128. A daily usage notification order is then generated so that the customer will be notified of the usage charge for that day as well as the remaining account balance in step 130. If the balance is now less than or equal to zero, as determined in step 132, then a service suspend order is created in step 134 and a suspend notification order is created in step 136. Unless the customer makes a payment prior to the suspend order being processed, the utility service will be suspended. If the account balance is greater than zero but less than or equal to a grace amount, as determined in step 138, then a service suspend notification order is created in step 136. The user will be notified that suspension of services is imminent if payment is not made. If the account balance is not less than or equal to the suspend threshold but is less than or equal to a low balance threshold amount, as determined in step 140, then a low balance notification order is created in step 142. The user will be notified that the account balance has reached a certain low threshold amount and that payment should be made in a timely manner. The process ends in step 144.

Figure 7:
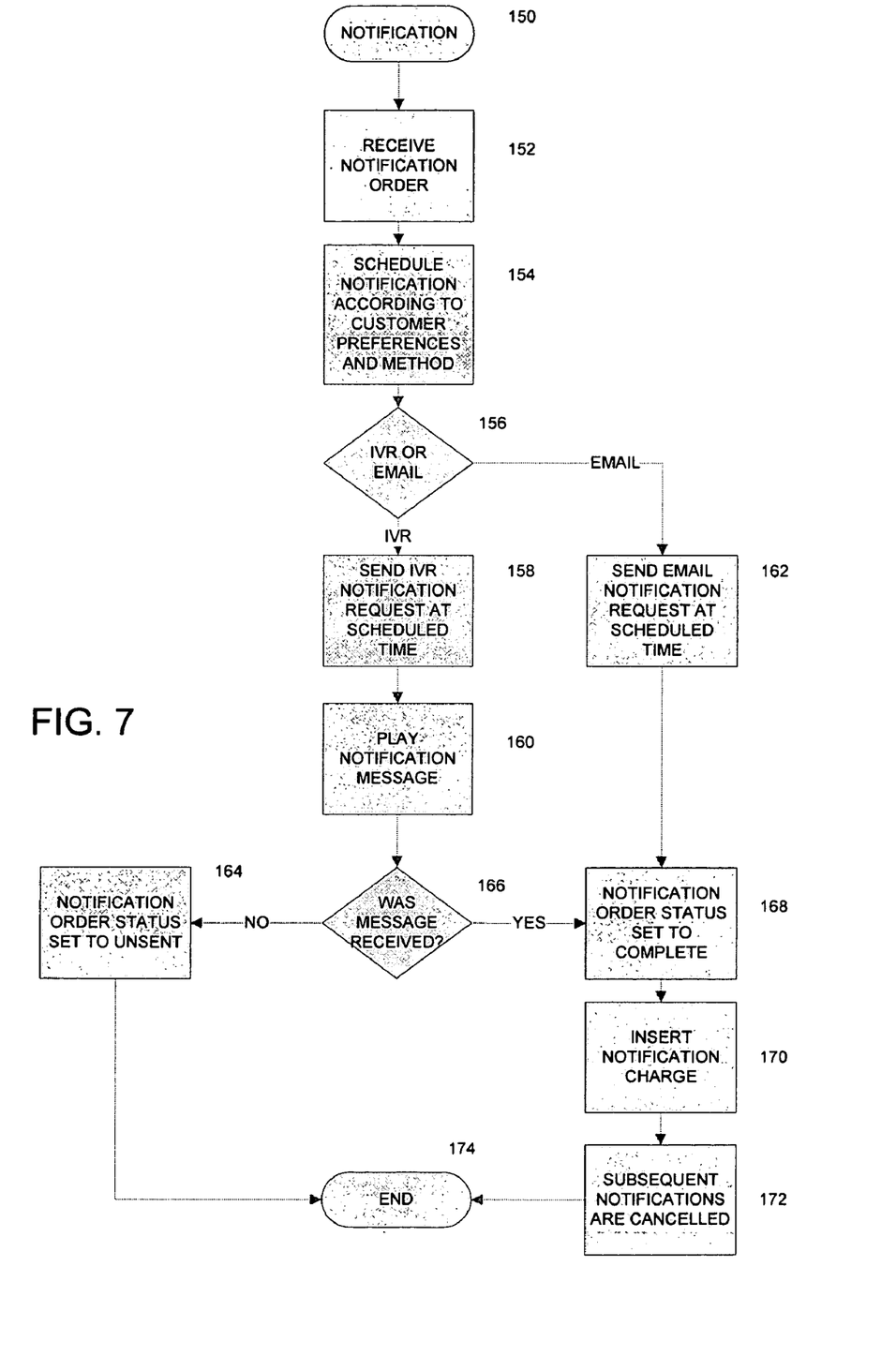
FIG. 7 is a flowchart of an embodiment of a method of providing customer notification.

FIG. 7 is a flowchart of an embodiment of a method 150 of providing customer notification in response to specific triggers associated with the prepay customer accounts. In step 152, a notification order is received by notification system 32. The notification order may include the customer account number, customer name, and the type of notification (e.g. daily usage, recharge, low balance, suspend). Notification system 32 is operable to access database 26 to obtain additional data such as current account balance and notification preferences, if necessary. Notification system 32 then schedules the notification according to the customer preferences in terms of the notification method and preferred time in step 154. If the preferred method selected by the customer is interactive voice response, as determined in step 156, then an interactive voice response message is delivered to the customer-specified telephone number at the scheduled time in steps 158 and 160. If the preferred notification delivery method is email, then an appropriate email message is transmitted to the customer's email address at the scheduled time in step 162. Upon successful completion, notification charges are applied to the account in step 170 and all subsequent notifications of the same type are cancelled in step 172. The process ends in step 174. Although not specifically shown, system 10 may use other notification methods such as text messaging, pager, and customer service representative call, etc.

Figure 8:
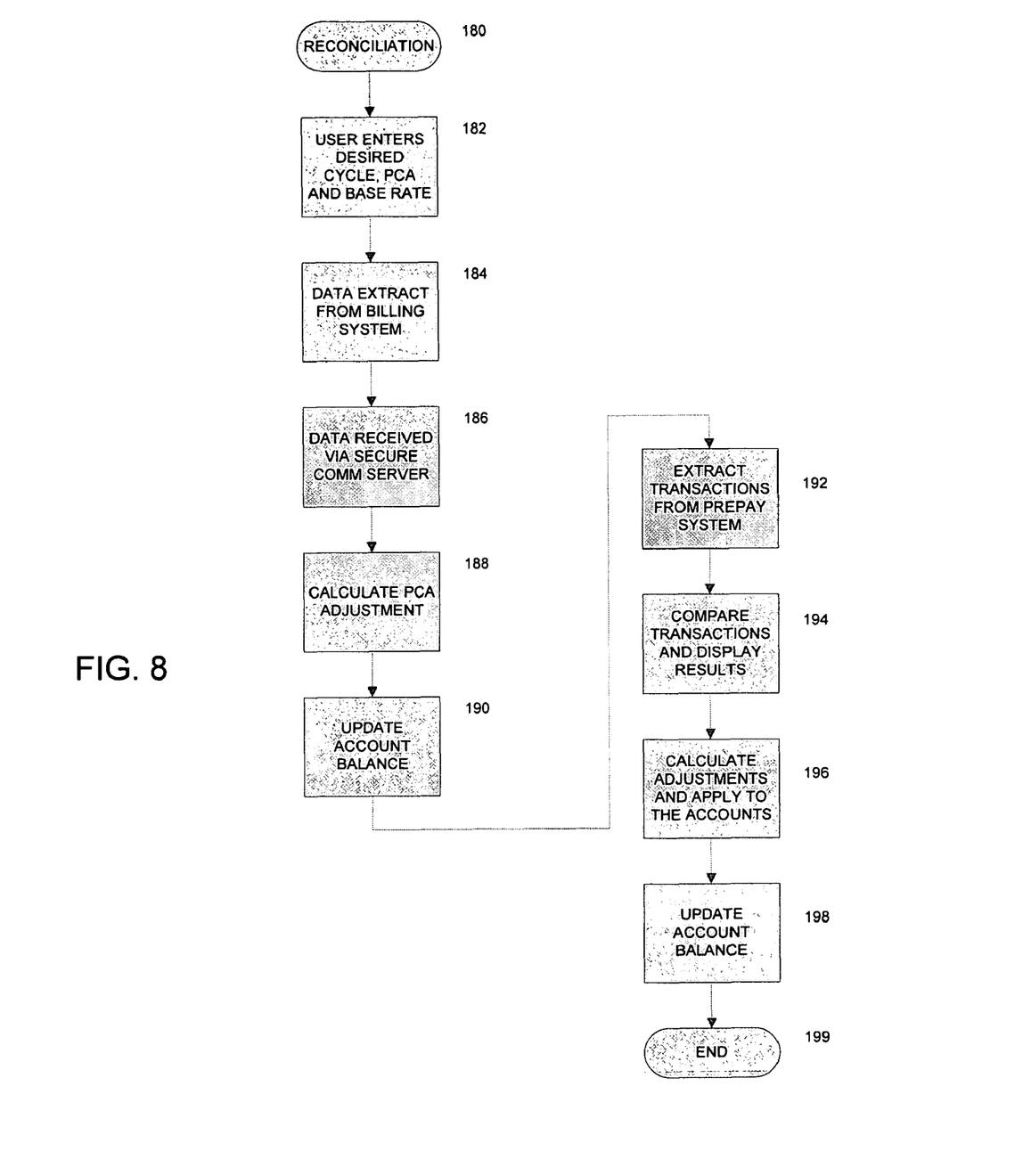
FIG. 8 is a flowchart of an embodiment of a method of reconciling a customer's account with a legacy billing system.

FIG. 8 is a flowchart of an embodiment of a method 180 of reconciling the prepay account with the legacy billing system account. This process provides a true-up of the prepay balance based on estimated charges applied daily throughout the billing cycle with actual charges applied in the same billing cycle. The process begins with step 182 by collecting, from a service representative or a billing personnel, certain data which includes the base rate, desired cycle date and the actual power charge adjustment to be used. Accounts to be reconciled are selected based on the billing cycle date entered by the user. In step 184, billing information for each account to be reconciled is extracted from the legacy billing system 18. The data elements include: total kilowatt hours used, beginning meter reading, ending meter reading, additional charges, taxes, and the number of days in the billing cycle. In step 184 the data is sent to the prepay server 20 via the secure communication servers 24 and 25. The PCA adjustment is calculated in step 188 by subtracting the estimated PCA charge in the prepay database from the actual PCA charge from the legacy billing system. The customer's balance is then updated to include the PCA adjustment in step 190. All debits and credits are pulled from the prepay system for the same date range for the accounts being reconciled in step 192. In step 194, a comparison is made between the data received from the legacy billing system and the data from the prepay system pulled in step 192. The results are then reported to the user for acceptance and verification. Adjustments are calculated and applied to the accounts in step 196 and the balance is update in step 198. Step 199 is the end of the process.

Figure 9:
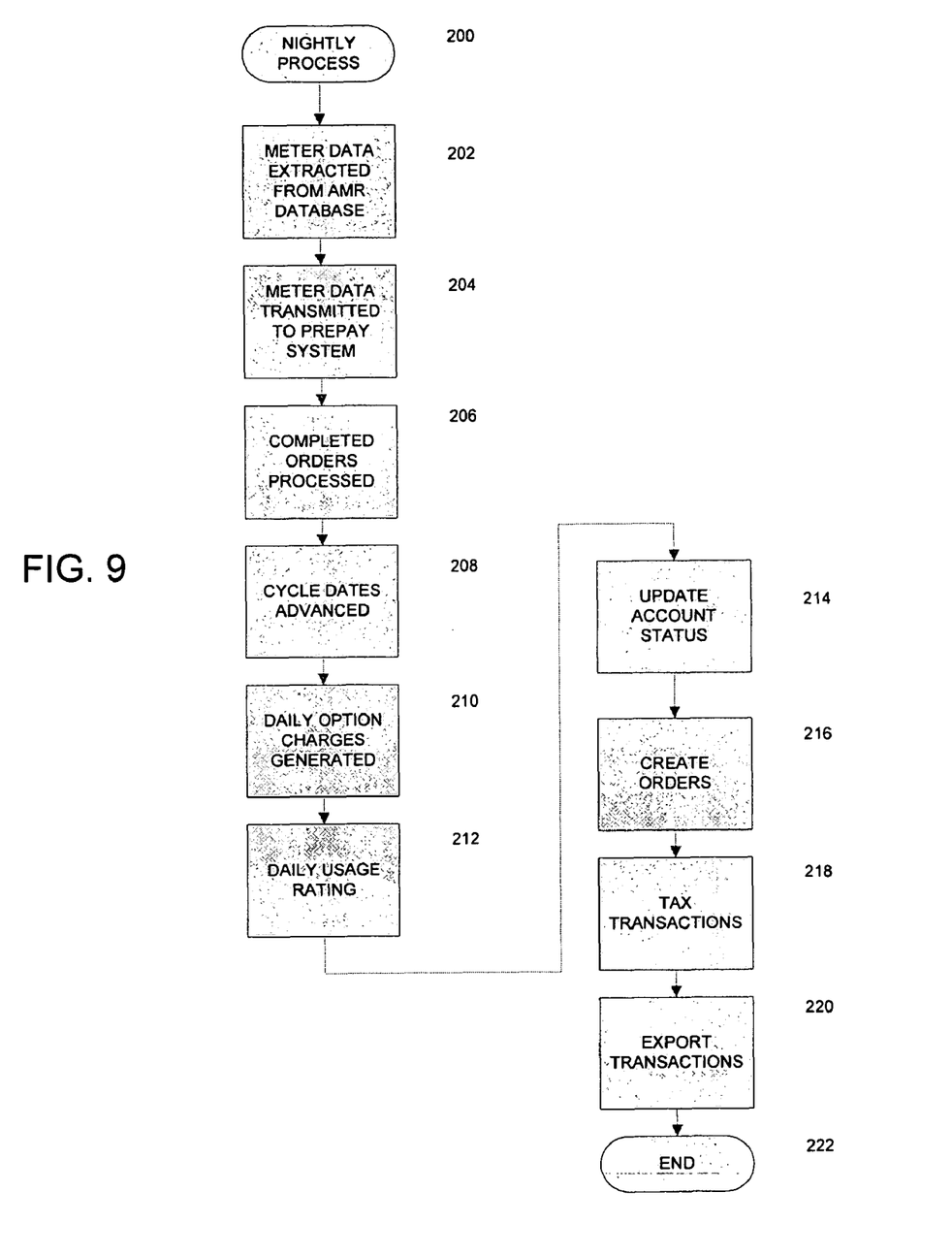
FIG. 9 is a flowchart of an embodiment of a method for nightly processing.

FIG. 9 is a flowchart of an embodiment of a method 200 of nightly processing prepay accounts. Processes included in the nightly process are those which may require unrestricted access to the database or require the existence of external data which can only be obtained once per day. Extracting the previous day's meter readings from the AMR database is accomplished by the prepay system initiating a request via the secure communication server 24 in step 202. The request contains a list of the meter numbers that are prepay accounts. The extracted data is transmitted to the prepay system in step 204. All orders that have been previously been completed are processed in step 206 and include: suspend, recharge, reconnect and change orders. Account cycle dates are advanced for all accounts whose cycle date is less than or equal to the current date in step 208. In conjunction with advancing the cycle date, all transactions (debits, credits and payments) are logged which is necessary for account reconciliation. Daily option charges are calculated and applied to the account in step 212. Accounts with a balance less than the suspend threshold are then updated to Past Due in step 214. This is a prerequisite to step 216 in which suspend orders are generated. Notification orders are also created in this step based on the specific criteria. Applicable taxes are calculated in step 218 for all transactions that are considered taxable. Charges that are generated by the prepay system that would not normally be included in the legacy billing system are identified and exported in step 220. The process ends in step 222.

Figure 10:
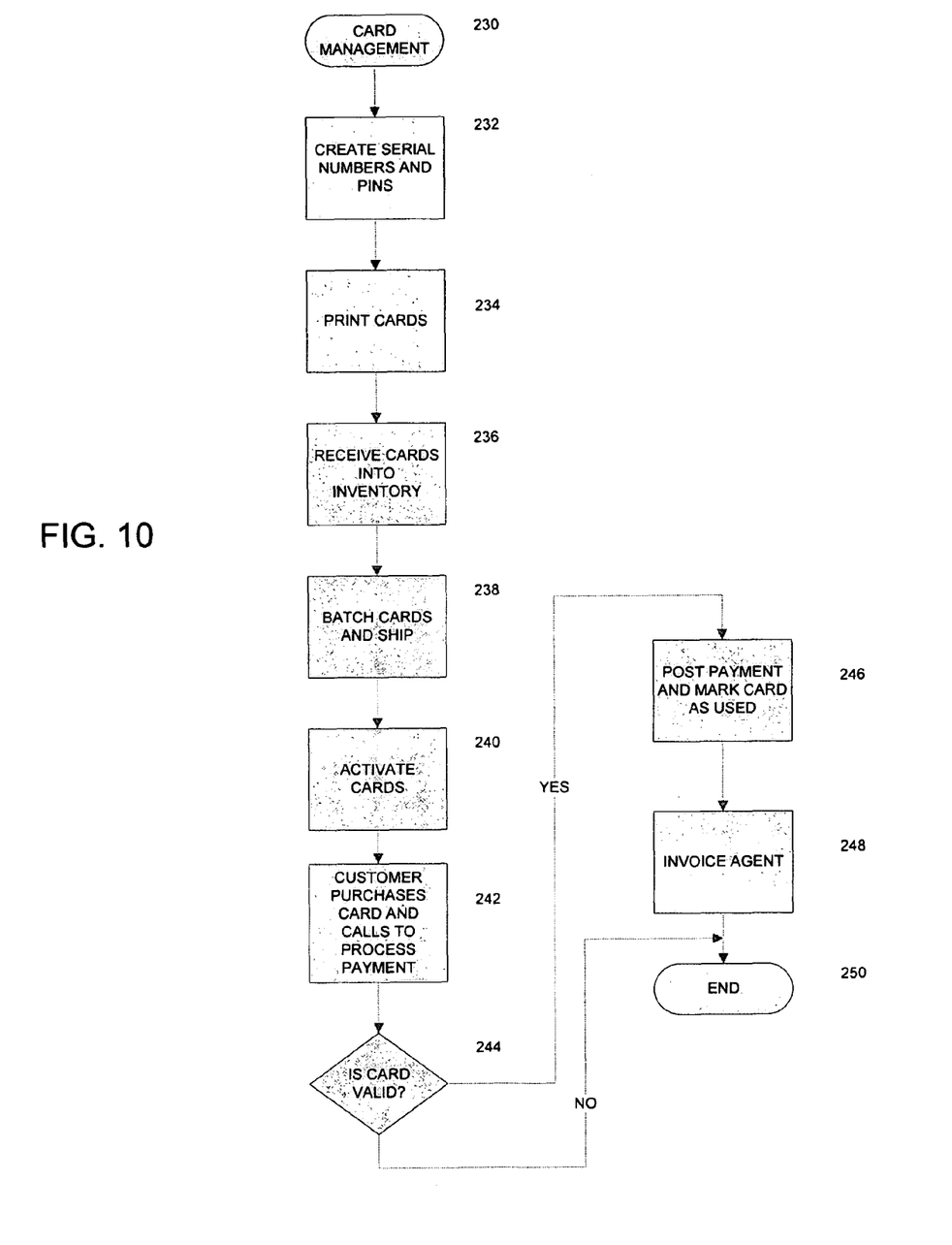
FIG. 10 is a flowchart of an embodiment of a method for prepaid card management.

FIG. 10 is a flowchart of an embodiment of a method 230 of a prepaid card management subsystem. The capability to use a prepaid card to pay for electric service is supported in the prepaid account management system. Prepaid cards are required to contain a unique serial number and PIN as well as a predetermined denomination. These are generated and stored in step 232. The cards are printed in step 234 and upon receipt, they are added to the inventory in step 236. Cards are packaged into batches and sent to agents or retail locations in step 240. Upon confirmation of receipt by the agent, the cards activated in step 240. Once the cards are activated, they are sold to the customer who in turn calls an automated voice response system or the utility company to process the card in step 242. Before a payment can be posted to the customer's account, the card must be validated in step 244 (see FIG. 11 for details). If the card is determined to be valid, a payment is posted to the customer's account and the card is marked as used within the system in step 246. If the card is invalid, no further action is required. Agents are invoiced for all processed cards on a weekly or monthly basis as determined by the utility in step 248. The process ends in step 250.

Figure 11:
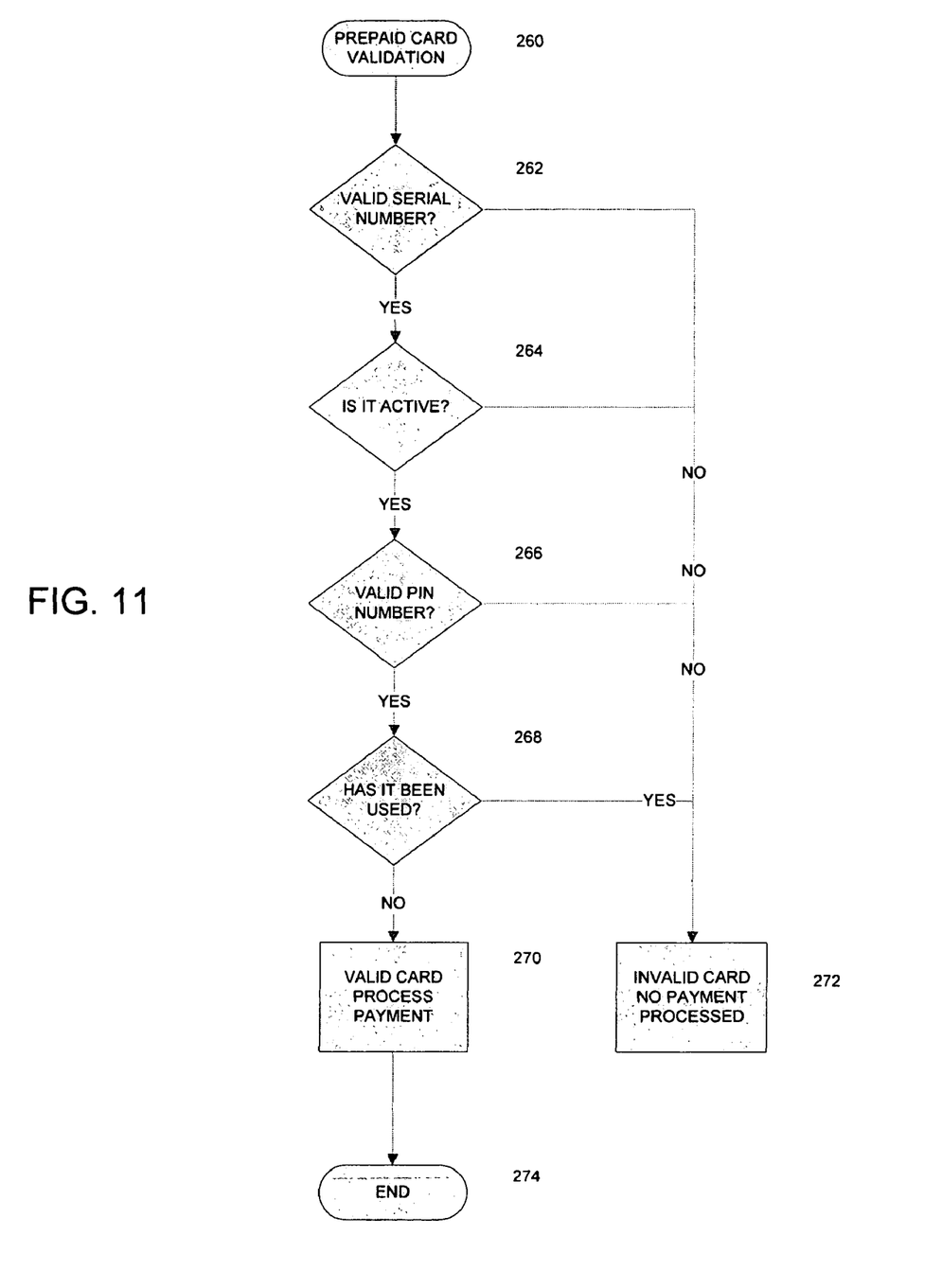
FIG. 11 is a flowchart of an embodiment of a method for prepaid card validation.

FIG. 11 is a flowchart of an embodiment of a method 260 of the prepaid card validation process. Before a prepaid card payment can be posted, there are several validation points that must be passed. In step 262 the serial number is checked to ensure it is valid by performing a look up in the inventory. If the serial number is valid, the card is then checked to ensure that it has been activated by the agent in step 264. If the card is determined to be active, the PIN number is verified in step 266. The last check is to ensure that the card has not been used in step 268. If it has not, the validation is passed and the payment may be posted in step 270. If any of the validation steps fail, the card is rejected and no payment is processed in step 272. The process ends in step 274

By taking advantage of the prepay utility service, the customers do not have to pay a deposit or go through a credit check to get utility service. Instead, the customer pays a small installation fee and an initial amount determined by the utility company. The prepay service may be advantageously used by the customers as a budgeting device that enables a higher priority be placed on uninterrupted utility service. The pay-as-you-go model of the prepay service is easy to comprehend and follow for some segments of the society living a certain lifestyle. The customers are also able to monitor their daily utility usage or at any time and to specify the notification methods that best suit their lifestyle. The customer may make payments at any time and for any amount using a number of methods and outlets.

System 10 as described herein may be easily integrated with existing systems of a utility company. For example, a secure communication server 24 may be provided onsite at a utility company to transmit prepay account and usage information to subsystem 14 to process and administer the prepay accounts. By providing the prepay utility service as described herein, existing accounts receivable amounts are significantly reduced and the number of delinquent accounts is also minimized or eliminated. By taking advantage of modern communication channels, the utility company is able to keep the prepay customer apprised of his/her account balance and provide advanced warning of depleting funds in the prepay account by interactive voice response, email and other electronic means. The utility company no longer needs to attend to the burdensome and costly task of generating and sending monthly billing statements and collections on late payments.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A prepay account management system for use with a legacy post-pay billing system, the legacy post-pay billing system having a customer account database operable to store customer account data the system, and the prepay account management system comprising:

a prepay account database operable to store prepay customer account data and estimated usage charges for each prepay customer;

a secure data link operable to transmit the prepay customer account data and actual usage charges of a prepay customer between the prepay account management system and the legacy post-pay billing system, wherein the actual usage charges of the prepay customer are extracted from the legacy post-pay billing system;

a prepay server operable to:

receive the transmitted prepay customer account data and actual usage charges, the prepay server having at least one interface that is operable to receive a replenishing payment amount;

update in the prepay account database a balance of a prepay customer account in response to the estimated usage charges and the replenishing payment amount;

reconcile a balance of a prepay customer account with the actual usage charges of the prepay customer extracted from the legacy post-pay billing system by comparing the estimated usage charges with the actual usage charges; and     a notification server operable to deliver a notification to the prepay customer in response to specific triggers associated with the prepay customer account according to prepay customer preferences.

2. The system of claim 1, wherein the notification server is operable to deliver a low balance notification to the prepay customer in response to the customer's account balance being below a certain amount, a daily usage notification in response to one of daily estimated usage charges and daily actual usage charges, and a suspend notification in response to the customer account balance being below a certain suspend threshold.

3. The system of claim 1, wherein the notification server is operable to deliver the notification according to method and timing preferences specified by the prepay customer.

4. The system of claim 1, further comprising a secure communication server affecting the secure data link and operable to receive the prepay customer account data and transmitting the data to the prepay server.

5. The system of claim 1, further comprising an actual usage server operable to receive actual usage data of the prepay customer.

6. The system of claim 1, further comprising an interactive voice response system in communication with the notification server operable to deliver pre-recorded voice messages and data from the prepay server to the prepay customer.

7. The system of claim 1, wherein the notification server is coupled to the Internet for transmitting electronic notifications to the prepay customer.

8. The system of claim 1, further comprising a prepay card management system operable to manage prepaid cards purchased by the prepay customer as payment to the prepay customer account.

9. The prepay account management system of claim 1, wherein the prepay server is operable to deduct from the balance of a prepay customer account in response to daily estimated usage charges, daily actual usage charges, daily option charges, and taxes.

10. The system of claim 1, wherein the prepay server is operable to update a balance of a prepay customer account in response to estimated usage charges and/or taxes based on a time-of-day and/or day-of-week the usage occurred.

11. The system of claim 1, wherein the prepay server is operable to reconcile a balance of a prepay customer account by performing a true-up of the prepay customer account balance based on estimated usage charges applied in a billing cycle with actual usage charges applied in the same billing cycle.

12. The system of claim 1, wherein the estimated usage charges include daily estimated usage charges and wherein the prepay server is operable to update on a daily basis in the prepay account database a balance of a prepay customer account in response to the daily estimated usage charges and the replenishing payment amount.

13. The system of claim 1, wherein the prepay server is operable to update on a real-time basis in the prepay account database a balance of a prepay customer account in response to the estimated usage charges and the replenishing payment amount.

14. A prepay account management system in use with a post-pay billing system, the prepay account management system comprising:
a prepay customer database operable to store the prepay customer account balance, prepayment, preferences and estimated usage data of the prepay customer,
a data link operable to transmit a prepay customer account balance, prepayment, preferences and actual usage data of a prepay customer between the prepay account management system and the post-pay billing system, wherein the actual usage data of the prepay customer is extracted from the post-pay billing system;
a prepay server operable to:
receive the transmitted prepay customer account balance, prepayment, preferences and actual usage data, the prepay server having at least one interface that is operable to receive replenishing payment amounts;
update a current balance of a prepay customer account in response to the estimated usage data and the replenishing payment amounts; and
reconcile a balance of a prepay customer account with the actual usage data of the prepay customer extracted from the post-pay billing system by comparing the estimated usage data with the actual usage data.

15. The system of claim 14, further comprising a notification server operable to generate a low balance notification to a specified customer in response to the customer's account balance being below a certain amount, a daily usage notification order in response to daily usage charges, and a suspend notification in response to the customer account balance being below a certain suspend threshold, the notifications being delivered in a manner consistent with the prepay customer preferences.

16. The system of claim 14, further comprising a secure communication server affecting the data link and operable to receive the prepay customer account balance, prepayment, preferences and actual usage data and transmitting the data to the prepay server, and wherein the data link is a secure data link.

17. The system of claim 14, further comprising an actual usage server operable to receive actual usage data of the prepay customer from a remote automated meter reading database.

18. The system of claim 14, further comprising an interactive voice response system in communication with the notification server operable to deliver pre-recorded voice messages and data derived from the prepay server to the prepay customer.

19. The system of claim 14, wherein the notification server is coupled to the Internet for transmitting electronic notifications to the prepay customer.

20. The system of claim 14, wherein the prepay server is operable to reconcile a balance of a prepay customer account by performing a true-up of the prepay customer account balance based on estimated usage charges applied in a billing cycle with actual usage charges applied in the same billing cycle.

21. The system of claim 14, wherein the estimated usage data includes daily estimated usage data and wherein the prepay server is operable to update on a daily basis in the prepay customer database a current balance of a prepay customer account in response to the daily estimated usage data and the replenishing payment amounts.

22. The system of claim 14, wherein the prepay server is operable to update on a real-time basis a current balance of a prepay customer account in response to the estimated usage data and the replenishing payment amounts.

23. An apparatus comprising: a tangible computer-readable storage structure storing a computer program that includes a plurality of computer instructions executable by a processor, the plurality of computer instructions including:
instructions for receiving prepay customer account data including actual utility usage amount for a prepay customer from a customer account database of a post-pay billing system;
instructions for storing the prepay customer account data in a prepay account database;
instructions for receiving a payment amount for utility services corresponding to a prepay customer;
instructions for updating a prepay customer account balance in the prepay account database, in response to the payment amount;
instructions for receiving an estimated utility usage amount for a prepay customer;

instructions for updating the prepay customer account balance in the prepay account database in response to the estimated utility usage amount;

instructions for reconciling the prepay customer account balance in the prepay account database with the actual utility usage amount of the prepay customer extracted from the post-pay billing system by comparing the estimated utility usage amount with the actual utility usage amount; and instructions for notifying the prepay customer in response to predetermined triggers associated with the prepay customer account.

24. The apparatus of claim 23, wherein the plurality of computer instructions further includes instructions for notifying the prepay customer of low account balance in response to the prepay customer account balance being below a low threshold.

25. The apparatus of claim 23, wherein the plurality of computer instructions further includes instructions for notifying the prepay customer of imminent suspension in response to the prepay customer account balance being below a suspend threshold.

26. The apparatus of claim 23, wherein the plurality of computer instructions further includes instructions for notifying the customer in a manner that is consistent with prepay customer preferences in delivery time and frequency.

27. The apparatus of claim 23, wherein the instructions for receiving a payment include instructions for receiving a payment made via at least one of a money transfer service, bill payment service, a credit card or debit card online or over the telephone with the customer service representative, automated clearing house fund transfer networks, an authorized agent, and a prepaid card.

28. The apparatus of claim 23, wherein the plurality of computer instructions further includes instructions for generating a suspend order in response to the prepay customer account balance being below a suspend threshold.

29. The apparatus of claim 23,
wherein the instructions for receiving the estimated utility usage amount of the prepay customer include instructions for receiving daily estimated utility usage amount; and
wherein the instructions for updating the prepay customer account balance include instructions for updating the prepay customer account balance in the prepay account database in response to the daily estimated utility usage amount.

30. The apparatus of claim 23,
wherein the instructions for receiving the actual utility usage amount include instructions for receiving real-time utility usage data; and
wherein the instructions for reconciling the prepay customer account balance include instructions for reconciling the prepay customer account balance in the prepay account database in response to the real-time utility usage data.

31. The apparatus of claim 23, wherein the instructions for notifying the prepay customer includes instructions for notifying the prepay customer via one of email, text messaging, interactive voice response and a customer service representative call.

32. The apparatus of claim 23, wherein the instructions for reconciling the prepay customer account balance includes instructions for reconciling the prepay customer account balance based on estimated usage charges in a billing cycle with actual usage charges applied in the same billing cycle.

33. The apparatus of claim 23, wherein the instructions for receiving the payment amount for utility services corresponding to the prepay customer includes:
instructions for validating a prepaid card having the prepayment amount, the instructions for validating the prepaid card including:
instructions for checking a serial number of the prepaid card against a list of valid serial numbers, wherein if the serial number is not within the list the prepaid card is invalid;
instructions for determining whether the prepaid card has been previously activated, wherein if the prepaid card has not been previously activated then the prepaid card is invalid;
instruction for verifying a personal identification number (PIN) associated with the prepaid card, the PIN being different than the serial number, wherein if the PIN is not verified then prepaid card is invalid; and
instructions for determining whether the prepaid card has been previously used, wherein if the prepaid card has been previously used then the prepaid card is invalid.

34. A prepay account management system for use with a legacy post-pay billing system, the legacy post-pay billing system having a customer account database operable to store customer account data the system, and the prepay account management system comprising:
a prepay account database operable to store prepay customer account data;
a secure data link operable to transmit a prepay customer account data and usage charges of a prepay customer between the prepay account management system and the legacy post-pay billing system;
a prepay server operable to:
receive the transmitted prepay customer account data, the prepay server having at least one interface that is operable to receive a replenishing payment amount;
update in the prepay account database a balance of a prepay customer account in response to the usage charges and the replenishing payment amount;
reconcile a balance of a prepay customer account with the legacy post-pay billing system; and
a notification server operable to deliver a notification to the prepay customer in response to specific triggers associated with the prepay customer account according to prepay customer preferences.

* * * * *